(12) United States Patent
Bent et al.

(10) Patent No.: US 11,140,127 B2
(45) Date of Patent: *Oct. 5, 2021

(54) OPTIMISING DATA TRANSMISSION IN A HYPERCUBE NETWORK

(71) Applicant: International Business Machines Corporation, Armonk, NY (US)

(72) Inventors: Graham A. Bent, Winchester (GB); Patrick Dantressangle, Chandlers Ford (GB); Paul D. Stone, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/691,937

(22) Filed: Nov. 22, 2019

(65) Prior Publication Data

US 2020/0177542 A1  Jun. 4, 2020

Related U.S. Application Data

(63) Continuation of application No. 15/677,678, filed on Aug. 15, 2017, now Pat. No. 10,608,982, which is a (Continued)

(30) Foreign Application Priority Data

Oct. 26, 2011 (EP) ..................................... 11186670

(51) Int. Cl.
*G06F 15/16* (2006.01)
*H04L 29/12* (2006.01)
*H04L 12/721* (2013.01)

(52) U.S. Cl.
CPC .............. *H04L 61/20* (2013.01); *H04L 45/06* (2013.01); *H04L 45/12* (2013.01); *H04L 45/14* (2013.01)

(58) Field of Classification Search
CPC ......... G06F 2212/651; G06F 15/17312; H04L 45/12; H04L 61/20
See application file for complete search history.

(56) References Cited

U.S. PATENT DOCUMENTS 5,170,482 A    12/1992   Shu et al.
5,255,368 A * 10/1993   Barry ................ G06F 15/17381
                                                  709/243

(Continued)

FOREIGN PATENT DOCUMENTS

CN      1704921 A     12/2005
EP      11186670.3    10/2011

(Continued)

OTHER PUBLICATIONS

International Application No. PCT/EP2012/068874, Search Report and Written Opinion, dated Nov. 29, 2012, 7 pages.

(Continued)

*Primary Examiner* — Umar Cheema
*Assistant Examiner* — Tesfu N Mekonen
(74) *Attorney, Agent, or Firm* — Peter J. Edwards

(57) ABSTRACT

A method of operating a hypercube network of processing devices includes determining that a plurality of the processing devices are storing data to be processed at a single processing device, obtaining the addresses of the plurality of processing devices storing the data to be processed, determining the most common number for each digit of the addresses of the plurality of processing devices storing the data to be processed, generating a new address comprising the determined most common number for each digit, and transferring the data to be processed to the processing device with the generated new address.

15 Claims, 6 Drawing Sheets

Related U.S. Application Data continuation of application No. 14/237,403, filed as application No. PCT/EP2012/068874 on Sep. 25, 2012, now Pat. No. 9,769,112.

(56) References Cited

U.S. PATENT DOCUMENTS

| | | | |
|---|---|---|---|
| 5,367,692 A | | 11/1994 | Edelman |
| 5,404,562 A | * | 4/1995 | Heller ............... G06F 15/17381 709/238 |
| 5,471,589 A | * | 11/1995 | Akkawi ............ G06F 15/17381 370/406 |
| 5,884,046 A | | 3/1999 | Antonov |
| 5,991,866 A | | 11/1999 | Heller et al. |
| 6,021,118 A | | 2/2000 | Houck et al. |
| 6,230,252 B1 | | 5/2001 | Passint et al. |
| 6,741,552 B1 | * | 5/2004 | McCrosky ......... H04L 12/5601 370/218 |
| 6,769,056 B2 | | 7/2004 | Barry et al. |
| 7,379,424 B1 | | 5/2008 | Krueger |
| 7,424,524 B2 | | 9/2008 | Fish, III |
| 7,684,328 B2 | | 3/2010 | Kawahara et al. |
| 7,844,959 B2 | | 11/2010 | Isard |
| 8,108,512 B2 | | 1/2012 | Howard et al. |
| 8,289,971 B2 | | 10/2012 | Furber |
| 8,667,049 B2 | | 3/2014 | Blumrich et al. |
| 8,830,873 B2 | | 9/2014 | Tomic et al. |
| 9,769,112 B2 | | 9/2017 | Bent et al. |
| 2003/0043756 A1 | | 3/2003 | Reynders et al. |
| 2003/0065632 A1 | * | 4/2003 | Hubey ................. G06N 3/0436 706/15 |
| 2004/0249803 A1 | * | 12/2004 | Vankatachary ......... H04L 45/00 |
| 2008/0082644 A1 | | 4/2008 | Isard et al. |
| 2009/0113172 A1 | | 4/2009 | Deneroff et al. |
| 2010/0241828 A1 | | 9/2010 | Yu et al. |
| 2014/0229633 A1 | | 8/2014 | Bent et al. |
| 2017/0346785 A1 | | 11/2017 | Bent et al. |

FOREIGN PATENT DOCUMENTS

| | | |
|---|---|---|
| JP | 2011076184 A | 4/2011 |
| WO | 2013060542 A1 | 2/2013 |

OTHER PUBLICATIONS

Unknown, "MIMD", Wikipedia, the free encyclopedia, 3 pages. Last accessed Dec. 31, 2015. https://en.wikipedia.org/wiki/MIMD#Hypercube_interconnection_network.

Bent et al., "A Dynamic Distributed Federated Database", 8 pages, Research was sponsored by the U.S. Army Research Laboratory and the U.K. Ministry of Defence and was accomplished under Agreement No. W911NF-06-3-0001. https://www.usukita.org/papers/3864/A%20Dynamic%20Distributed%20Federated%20Database.pdf.

Schlosser et al., "HyperCuP—Shaping Up Peer-to-Peer Networks", Computer Science Department, Stanford University, 12 pages.

Sakano et al., "A Scalable Multi-layer Hypercube Photonic Network Architecture", IEICE Technical Report, Mar. 1, 2010, vol. 109, No. 455; 9 pgs. English Abstract Included.

Bhuyan et al., "Generalized Hypercube and hyperbus Structures for a Computer Network", IEEE Transactions on Computers, vol. c-33, No. 4, Apr. 1984, pp. 323-333.

Hwang et al., "Generalization of Othogonal Mutiprocessor for Massively Parallel Computation", Dept. of Electrical Engineering—Systems, University of Southern California, 1988 Proceedings, 2nd Symposium on the Frontiers of Fairfax, VA, Oct. 10-12, 1988, IEEE Comm, pp. 391-398.

International Search Report for International Application No. PCT/EP2012/068874; Filing Date: Sep. 25, 2012; dated Nov. 29, 2012, 2 pgs.

Satyanarayanan, et al., "A Task Allocation Scheme for Hypercube Distributed Computing Systems Using the Affinity Graph Model", TENCON '89, Fourth IEEE Region 10 International Conference; Nov. 22-24, 1989; 4 pgs.

Bent et al., "Optimising Data Transmission in a Hypercube Network", U.S. Appl. No. 15/677,678, filed Aug. 15, 2017.

List of IBM Patents or Patent Applications Treated as Related, Dated Nov. 19, 2019, 2 pages.

* cited by examiner

| | | | | | |
|---|---|---|---|---|---|
| 1 | 0 | 1 | 0 | 0 | ⎫ |
| 1 | 1 | 1 | 1 | 1 | ⎪ |
| 0 | 0 | 1 | 1 | 0 | ⎬ SET S |
| 0 | 0 | 0 | 1 | 0 | ⎪ |
| 1 | 0 | 0 | 0 | 0 | ⎭ |
| | | | | | |
| 1 | 0 | 1 | 1 | 0 | } NODE C |

14 points to the top-left cell; 16 points to the bottom-left cell.

FIG. 3

OPTIMISING DATA TRANSMISSION IN A HYPERCUBE NETWORK

CROSS-REFERENCE TO RELATED APPLICATION

This is a continuation of U.S. application Ser. No. 15/677,678, filed Aug. 15, 2017. U.S. application Ser. No. 15/677,678 is a continuation of U.S. application Ser. No. 14/237,403, filed Feb. 6, 2014. U.S. application Ser. No. 14/237,403 is a U.S. National Stage of Application No. PCT/EP2012/068874; filed Sep. 25, 2012 and assigned International Publication No. WO2013/060542A1; published May 2, 2013, which claims priority to EP 11186670.3; filed Oct. 26, 2011, the contents of which in their entireties are herein incorporated by reference.

BACKGROUND

This invention relates to a method of operating a hypercube network of processing devices. In one embodiment, the invention provides a mechanism to optimise data transmission within the hypercube network by calculating a central location for processing of data.

In many computing environments multiple processing devices are connected together in a network. For example, highly complex software products may be split across multiple physical machines that are connected together. Similarly, tasks that are performed on the Internet are quite often carried out by multiple servers that are connected together as a network. A further example of such multiple processing devices is within individual machines such as supercomputers, which provide enormous processing power via the provision of multiple processing devices within the single machine.

When a number of processing devices are participating in a computation that requires data from multiple locations, the processing devices may need to pass a certain amount of data to a single point to be able to evaluate the computation. An example is a join query in a distributed database where data from two tables must be consolidated to a common node to evaluate the join query. The data may be present in differing volumes at different processing devices in the network.

Some computer networks, notably massively parallel supercomputers are configured in a hypercube topology. In this topology, each processing device has a small number of neighbors to which it is connected. To transmit data from one processing device to a known destination, it is passed between a succession of neighbors according to the logical addresses of the processing devices, which signify the position of the processing devices in the hypercube network, until the destination is reached.

When data is required to be transmitted from multiple processing devices to a single location for processing, if the quantity of data is high and/or the bandwidth between processing devices in the network is low, it is desirable to choose to transmit all the data to a specific processing device so that the total amount of data transmitted is minimised, thereby using the minimum network bandwidth in performing the computation. There is a requirement for a method and system for determining the location of the ideal processing device in such a network in this situation.

SUMMARY

According to a first aspect of the present invention, there is provided a method of operating a hypercube network of processing devices including determining that a plurality of the processing devices are storing data to be processed at a single processing device, obtaining the addresses of the plurality of processing devices storing the data to be processed, determining the most common number for each digit of the addresses of the plurality of processing devices storing the data to be processed, generating a new address including the determined most common number for each digit, and transferring the data to be processed to the processing device with the generated new address.

According to a second aspect of the present invention, there is provided a system including a hypercube network of processing devices, the system operated to determine that a plurality of the processing devices are storing data to be processed at a single processing device, obtain the addresses of the plurality of processing devices storing the data to be processed, determine the most common number for each digit of the addresses of the plurality of processing devices storing the data to be processed, generate a new address including the determined most common number for each digit, and transfer the data to be processed to the processing device with the generated new address.

According to a third aspect of the present invention, there is provided a computer program product on a computer readable medium for operating a hypercube network of processing devices, the product including instructions for determining that a plurality of the processing devices are storing data to be processed at a single processing device, obtaining the addresses of the plurality of processing devices storing the data to be processed, determining the most common number for each digit of the addresses of the plurality of processing devices storing the data to be processed, generating a new address including the determined most common number for each digit, and transferring the data to be processed to the processing device with the generated new address.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE DRAWINGS

Embodiments of the present invention will now be described, by way of example only, with reference to the accompanying drawings, in which:

FIG. 3 is a table of binary addresses in accordance with an exemplary embodiment;

Figure 1:
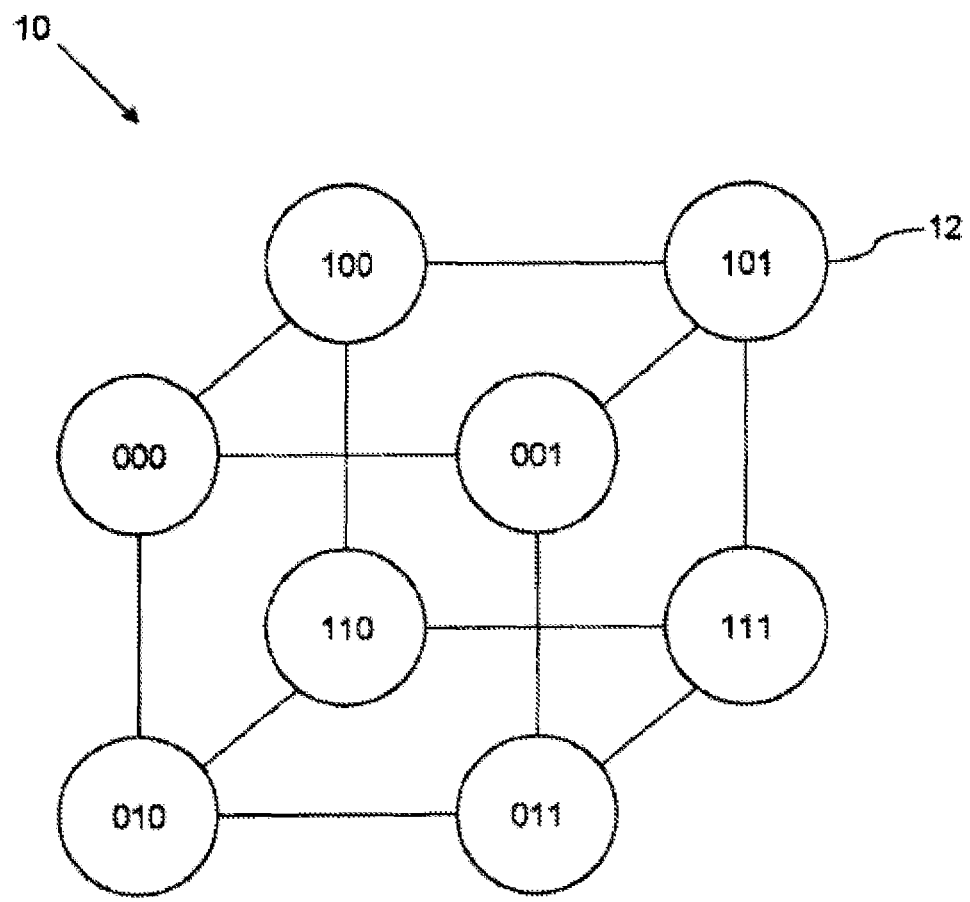
FIG. 1 is a schematic diagram of a hypercube network in accordance with an exemplary embodiment.

In exemplar embodiments, a mechanism is provided that determines which processing device in a hypercube network would result in the minimum total amount of network traffic once the distribution of data to be retrieved is known. An advantage is that, it improves the throughput of data-intensive distributed computations across a hypercube network.

For example, in a network of sixteen processing devices with four devices storing data that must be processed at a single location, the above method and system will determine which of the sixteen processing devices should do that work, while minimizing the amount of data transmission that is required within the network. The selected processing device may be one of the four that are storing the data or may be a completely different processing device in the network.

The processing devices that make up the hypercube network could be individual processors within a supercomputer, for example, which have memory attached to each individual processor. The processing devices could be machines such as standard desktop computers that are connected together via Ethernet, for example, to form a network of devices. Similarly, the processing devices could be geographically spread and connected together by a wide area network such as the Internet. The processing devices that make up the hypercube network need not be identical, different machines could be connected together as a network, for example a network of servers and client devices.

A hypercube network is a network in which all nodes of the network have a unique address of the same length, with connections between nodes of the network determined by the address, so that two nodes with an address that differs by only one digit are connected together. The number of processing devices that make up the hypercube network is not material. In a theoretically mathematically pure hypercube network the number of nodes (processing devices) in the network is a power of (2N), with each node having a binary label (address) that is N digits in length. Each node is connected to those nodes that have an address that differs by only one digit from its own address. For example, if N=3, there are 8 nodes labelled 000, 001, 010, 011, 100, 101, 110, and 111. Node 000 is connected to nodes 001, 010 and 100 etc. However in a practical implementation of the method and system, if the number of processing devices in the network is not a power of 2, then the network can still be configured as a hypercube network by labelling one or more processing devices with two binary addresses, as long as these two addresses are "adjacent" in hypercube topology terms and that the connections rules are still obeyed.

The method of determining the correct location of the processing device in the network for carrying out the processing of the data can be used on networks that can be categorised as "generalized hypercubes" (see Bhuyan, L. N. and Agrawal, D. P., "Generalized Hypercube and Hyperbus Structures for a Computer Network," IEEE Transactions on Computers, volume C-33, number 4, pages 323 to 333, April 1984 for more information). Generalized hypercubes expand on the standard concept of a hypercube by allowing the digits in the address label to be values other than just 0 or 1 used in binary addresses. For example all network labels could take digits 0, 1 or 2, giving 00, 01, 02, 10, 11, 12, 20, 21 and 22 as the set of labels for a 2 dimensional network. All routing remains the same as in a standard hypercube, so nodes are neighbors if the labels differ by one and only one digit (02 will be connected to nodes 12, 22, 00 and 01). Preferably, the method further includes determining the amount of data to be processed at each of the plurality of processing devices storing the data to be processed and wherein the step of determining the most common number for each digit of the addresses of the plurality of processing devices storing the data to be processed includes weighting the determination of the most common number for each digit according to the determined amount of data. The method and system for deciding which of the processing devices to use to process the data can be performed either as an unweighted procedure or as a weighted procedure. In the weighted procedure, the amount of data that each processing device is going to transmit is used in the determination of the most common numbers in the addresses. The advantage of weighting the process is that the selection of the processing device to carry out the processing of the data will be the one that results in the least amount of data being transmitted around the network.

In a hypercube network that uses binary addresses each digit of the addresses is looked at to compare 0s and 1s, which effectively splits the hypercube structure into two halves according to the dimension that is selected and then the number of contributing nodes that are in each half is determined, choosing the half with the most nodes. If the hypercube is split along all dimensions then a specific node is isolated as the center. In a weighted case, the hypercube is split in half along each dimension to see which half contains the most total data, effectively finding the "center of mass" of the data. Advantageously, the method further includes, if the most common number for a digit of the binary addresses of the plurality of processing devices storing the data to be processed returns more than one result, selecting just one of the returned results. The method, whether used in the weighted or unweighted form, can return more than one address; thereby implying that more than one processing device within the network can carry out the processing at equal cost in terms of bandwidth consumption. In this case, some selection logic is required to select between the different processing devices.

In exemplary embodiments, if a processing device of the plurality of processing devices storing the data to be processed is assigned more than one address, then obtaining the addresses of the plurality of processing devices storing the data to be processed, in respect of the processing device that is assigned more than one address, obtains only one address for that processing device. In order for the procedure to function properly if a processing device has more than one address attached to it, only one of those addresses will be used in the calculation of the best processing device to carry out the processing of the data that is stored by the multiple devices.

FIG. 1 shows a hypercube network 10 includes connected nodes 12. An n-dimensional hypercube network consists of N nodes where N is a power of 2 (2n). Each node 12 in the network 10 is allocated a node address which, in this example, is a binary number with n digits. In the example of FIG. 1, there is a three dimensional hypercube network with eight nodes that have the three-digit binary addresses 000, 001, 010, 011, 100, 101, 110 and 111. The nodes are connected together if their binary addresses differ by one and only one digit. So the node labelled 000 is connected to nodes 001, 010 and 100. The node labelled 101 is connected to nodes 100, 111 and 001 and so on.

The shortest path between two nodes is determined by comparing the addresses of the two nodes one digit at a time and travelling to a neighboring node when the address of the destination node and the address of the neighboring are the same, and different from the current node, for the specific digit in the binary address. In the example of FIG. 1, a message travelling from node 000 to node 101, will first travel to node 100 (the first digit changing from a 0 to 1) and then to node 101 (changing the final digit from a 0 to a 1). This defines the logical routing in a network that is configured as a hypercube network.

The same methodology applies to all hypercube networks of larger sizes. For example, if n=4 and if transmitting a network message from node 1100 to node 0111, the message can be transmitted from node 1100 to node 0100 (as the first digit of the address of the destination varies from the originator), then from node 0100 to node 0110 (the second digits of the destination and current node are the same, but the third digits are different), finally the message is transmitted from node 0110 to node 0111 (the destination). The message needs to be passed three steps to get from source to destination and this can be easily determined by counting the number of digits which are different in the source and destination addresses. In this example the addresses 1100 and 0111 differ by 3 digits so the message needs to travel three hops in the network to get between these nodes. The number of digits different between two addresses is called the Hamming Distance. There may be multiple paths of the same shortest length. In the example above the message could also have travelled 1100 to 1101 to 0101 to 0111, again using three hops.

Figure 2:
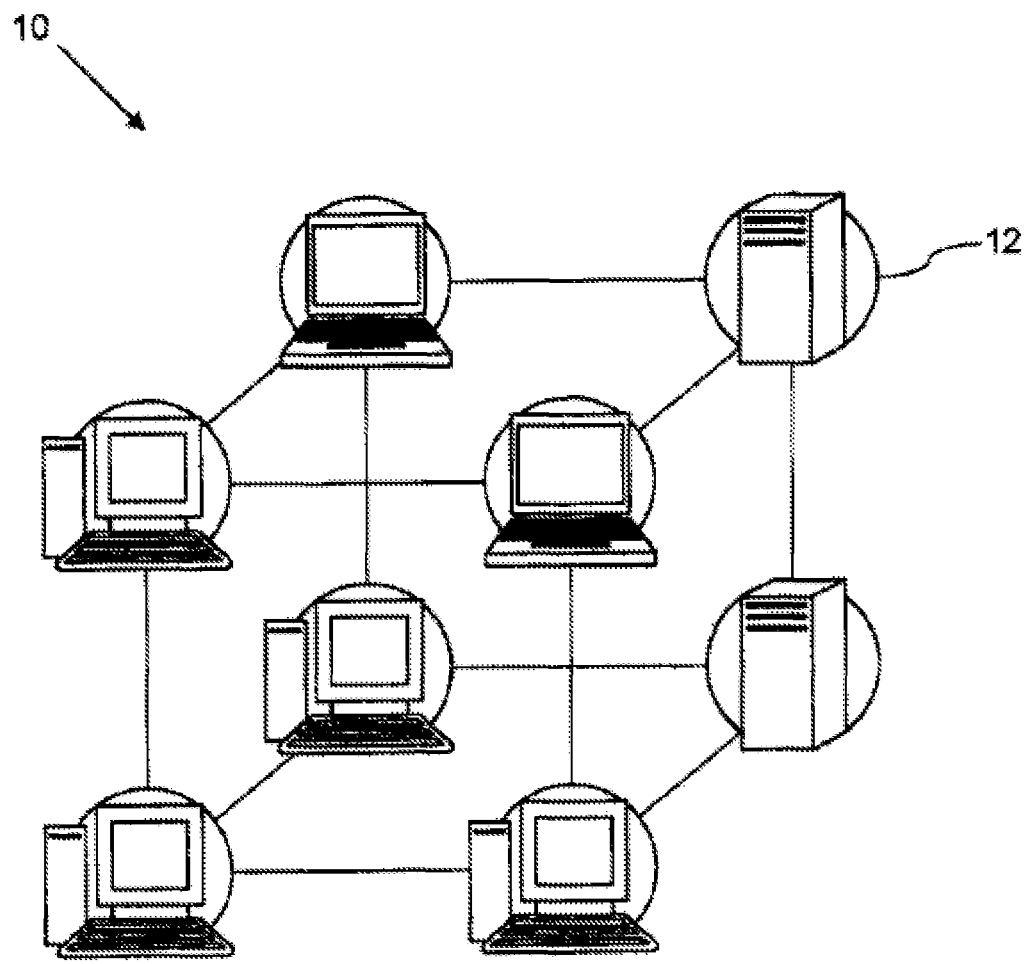
FIG. 2 is a further schematic diagram of a hypercube network in accordance with an exemplary embodiment.

FIG. 2 shows the hypercube network 10 of FIG. 1 which is comprised of a variety of processing devices 12. In this example, the processing devices 12 are servers and client devices, with the client devices made up of desktop computers and laptop computers. The processing devices are connected together via a suitable network such as a wide area network such as the Internet. The processing devices all have local storage available and store data for transmission around the network. The topology of the network is that of a hypercube network, with each processing device being assigned a unique binary address that reflects the connection topology of a hypercube network.

In general, a practical implementation of a hypercube network will have many more processing devices than the eight shown in FIG. 2. For example, in a supercomputer which has a very large number of processing devices connected together in a hypercube network, then n could be 5, 6 or even larger with 2n processing devices connected together. In such a network, each processing device is connected to n neighbors and the logical binary numbering represents the underlying physical structure of the network, in that, in general, processing devices that have binary addresses that differ by one (and so are logical neighbors) will be located physically close together within the network.

In such large networks, the transmission of data around the network is an important task, as for example if n=6, then two processing devices could theoretically be located six processing devices apart, and transmission of data between those two devices will pass through five other processing devices, following the routing discussed above. It is common in such systems that data is needed from multiple processing devices for processing at a single location. Since it is possible that any processing device within the network can carry out the processing, then the selection of the processing device for that task is very important in terms of bandwidth usage within the overall hypercube network.

The hypercube network can be configured to operate so that whenever data needs to be transmitted from multiple nodes to a single node for processing, the network will determine the center of the set of nodes. For example, a five dimensional hypercube may have a set of nodes S which are the addresses of a subset of the nodes of the hypercube graph, such that S=(10100, 11111, 00110, 00010, 10000). In this case, the set S contains the binary addresses of five labels from a five dimensional hypercube.

The network analyses the digits in each of the binary addresses of the nodes in S, to determine how many addresses have a "1" for each digit and how many addresses have a "O". In this example, in their first digit, two addresses have a "O" and three addresses have a "1". In their second digit, four addresses have a "O" and one address has a "1", and so on. This can be represented as follows: DigitCount (O)=(2,4,2,2,4) and DigitCount(1)=(3,1,3,3,1). For each digit is turn, there is then determined which digit count is the highest, and the address of a node C is set to the value of the digit with the highest count as follows: HighestDigitCount= (1,0,1,1,0) (in the first digit, digitcount(1)>digit count(O), in the second digit, digitcount(O)>digit count(1) etc.) so that C=10110.

In a more generalised hypercube scheme, where the addresses are not necessarily binary addresses, the method to calculate the central processing device to reduce data transmission remains the same, only for each digit there is an increased number of DigitCounts. For example, in a generalized hypercube network that includes network addresses with digits 0, 1 and 2, then there is a count up of three sets of digit count, DigitCount(O), DigitCount(1) and DigitCount(2) and the dimension with the highest digit count is chosen as the location of the central node, for each position in the address.

FIG. 3 illustrates the calculation, in a system that uses binary addresses. The set S of binary addresses 14 is used to generate a new binary address 16 of node C. The node with C as the address is the center node, relative to the members of the set S. This node has the minimum total distance from the set S of nodes. The total distance from node C to the nodes in S can be determined by summing the lowest digit count for each digit in the addresses as follows: DigitCount (O)=(2,4,2,2,4), DigitCount(1)=(3,1,3,3,1), LowestDigitCount=(2,1,2,2,1) and TotalLowestDigitCount=8 (2+1+2+2+1)

This method can be proved by considering the contribution of each digit in turn to the total Hamming Distance. If the node C has 0 as the first digit, there are three nodes which need to transmit data from their "1" dimension whereas if "1" is chosen as the first digit then there are only two nodes that need to transmit data (because two nodes have 0 in the first digit of their addresses). For each digit in the address, if the digit value is chosen with the highest count then the contribution is minimised to the overall number of legs that data needs to be transmitted, so minimising the overall distance that data needs to travel.

With an even number of nodes, there may be the same number of nodes with a 1 as with a 0 in a particular digit. In this case either 0 or 1 can be chosen for the digit of the central node, there will be multiple nodes each of which has equally minimum total distance to the set S of nodes.

Figure 4:
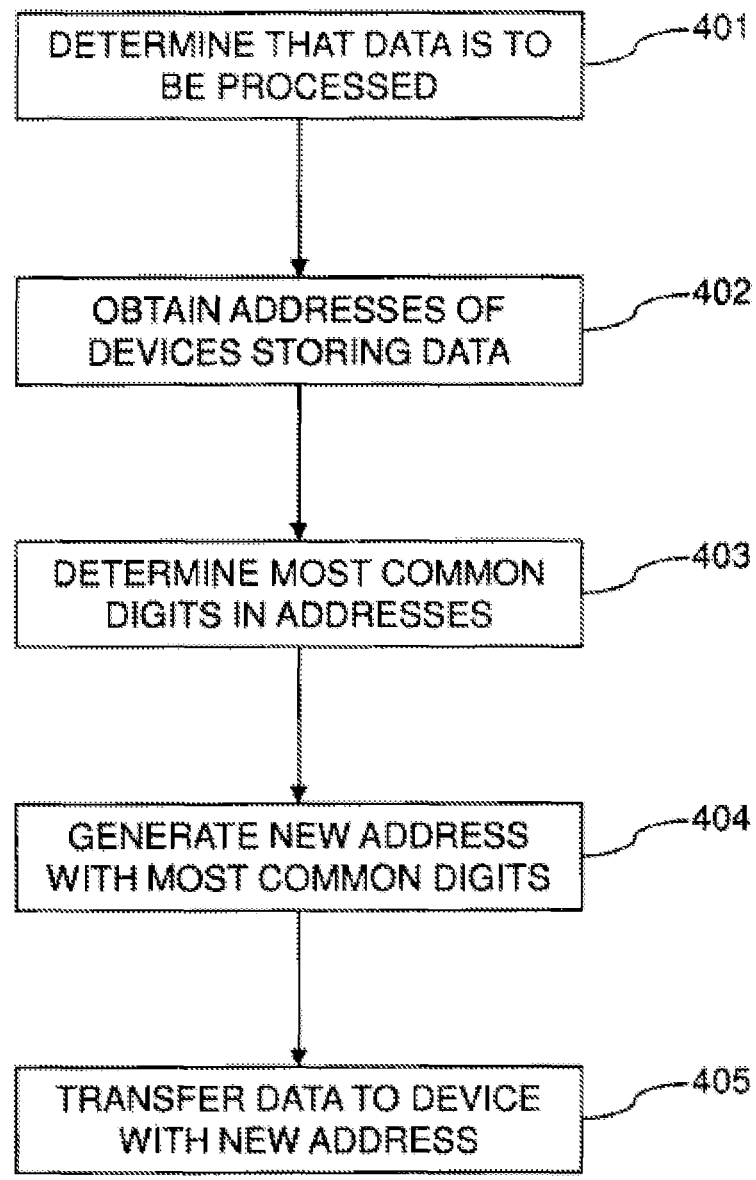
FIG. 4 is a flowchart of a method of operating the hypercube network in accordance with an exemplary embodiment.

This method of operating the hypercube network of processing devices is summarized in FIG. 4. As shown at block 401, the method includes determining that a plurality of the processing devices in the network is storing data to be processed at a single processing device. This may be as a result of a command being executed, that requires data from multiple locations to be processed as a single entity. Next, as shown at block 402, the method includes obtaining the addresses of the plurality of processing devices storing the data to be processed. As discussed above, the processing devices will each have a unique address (which may be a binary address) that identifies each device.

As shown at block 403, the method includes determining the most common number for each digit of the addresses of the plurality of processing devices storing the data to be processed. As illustrated above with reference to FIG. 3, for example, the binary addresses of the processing devices in the set of devices that are storing the data to be processed are examined to identify the most common digit in each position of the binary addresses. The nature of the hypercube network topology means that the addresses will all be the same length, and a simple count operation can be used to determine the most common digit in each position.

As shown at block 404, the method includes generating a new address including the determined most common number for each digit. Next, as shown at block 405 the method includes transferring the data to be processed to the processing device with the generated new address. The most common digits determined in at block 403 are used to generate the new address of the "center node", shown as node C in the example of FIG. 3. The data stored by all of the processing devices in the set of devices is then transferred to this new processing device with the new address comprised of the most common digits, where the data is then processed.

The process described above can be modified to take into account the amount of data being stored by the different processing devices. If this information is available then it is possible to determine the center of a set of nodes with different amounts of data at each node. For example, a set of nodes S which are the addresses of a subset of the nodes of a hypercube graph where each node has a known quantity of data that needs to be delivered to a common location such that D defines the quantity of data held at the nodes so that Di (the ith member of D) specifies the amount of data held at the node with address Si (the ith member of S).

Figure 5:
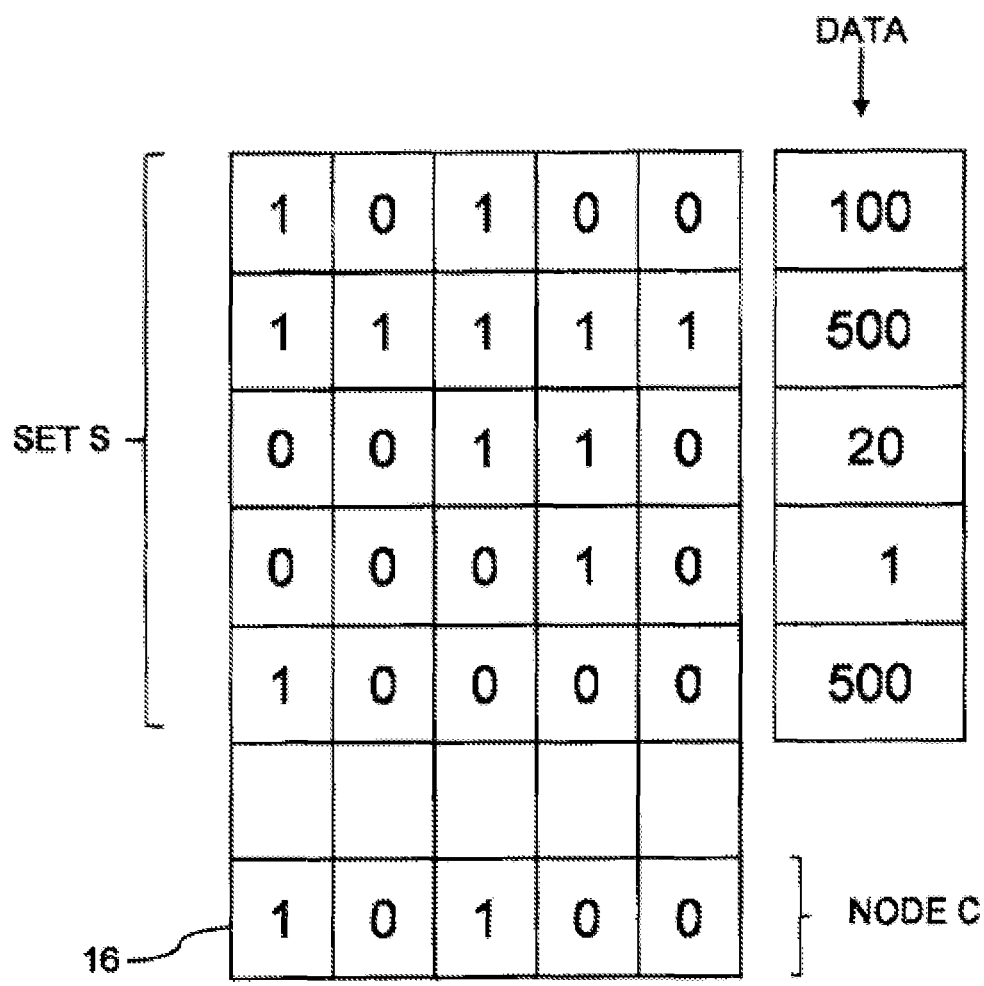
FIG. 5 is a table of binary addresses and data in accordance with an exemplary embodiment.

FIG. 5 illustrates such an example where S=(10100, 11111, 00110, 00010, 10000) and D=(100, 500, 20, 1, 500). In this case S contains the addresses of five labels from a five dimensional hypercube and D contains the amount of data held at the corresponding node in S (i.e. node 10100 holds 100 items of data, node 11111 holds 500 items of data etc.)

There is then performed an analysis of the corresponding digit in each of the addresses in S to determine the total amount of data held at addresses which have the value "1" for that digit and to determine the total amount of data held at addresses which have the value "O" for that digit. For example, in their first digits, two addresses have a "O", these addresses have 20 and 1 items of data so the total data at addresses with a "O" in the first digit is 21. Three addresses have a "1" in their first digit, these addresses have 100, 500 and 500 items of data so the total data at addresses with a "1" in the first digit is 1100. The analysis of each digit can be represented by maintaining a DataCount set for the 0 and 1 values as follows: DataCount(O)=(21, 621, 501, 600, 621) and DataCount(1)=(1100, 500, 620, 521, 500).

For each digit in turn, there is then determined which data count is the highest, and the address of the node C is set to the value of the digit with the highest count so that the HighestDataCount=(1,0,1,0,0) (in the first digit, DataCount1)>DataCount(O), in the second digit, DataCount(O) >DataCount(1) etc. Therefore C=10100 and the node with C as the address is the "center" node for this set of nodes and data amounts. Sending all data D from nodes S to this node incurs the minimum total data transmission.

The total amount of data that is transmitted from the nodes in the set S to the node C can be determined by summing the lowest DataCount for each digit in the addresses as follows: DataCount(O)=(21, 621, 501, 600, 621), DataCount(1)= (1100, 500, 620, 521, 500), LowestDataCount=(21, 500, 501, 521, 621) and TotalLowestDataCount=2043 (21+500+ 501+521+621).

This methodology can be proved by considering the contribution of each digit in turn to the total data transmitted distance. If the node C has a "O" as the first digit, there are 1100 units of data which need to be sent from the "1" dimension whereas if we choose "1" as the first digit then there are only 21 units of data that need to be transmitted. For each digit in the address, if the digit value with the most data is chosen then the contribution to the overall amount of data that needs to be transmitted is minimised from the other addresses. With any number of nodes, the total amount of data at addresses with "1" as with "O" in a particular digit may be the same. In this case either "O" or "1" can be chosen for the digit of the central node, there will be multiple nodes each of which has equally minimum total data transmission from the set S of nodes.

Figure 6:
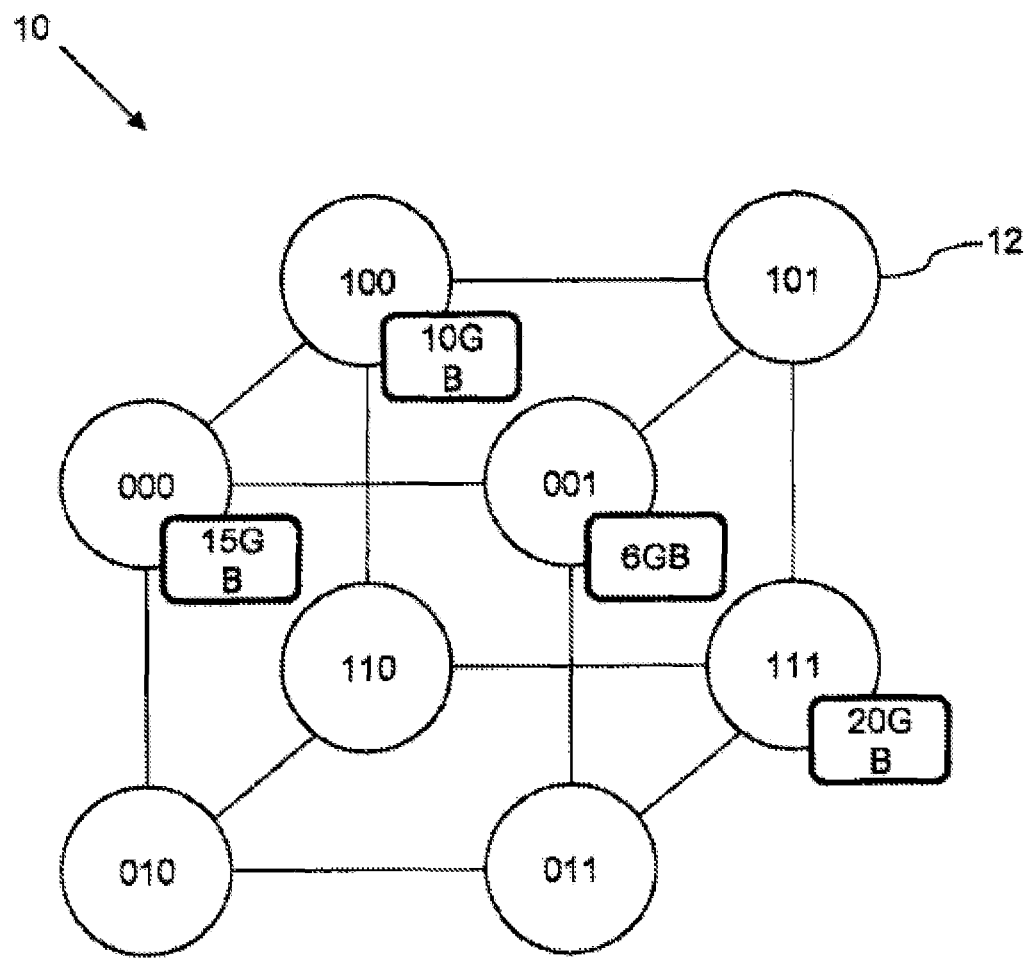
FIG. 6 is a yet further schematic diagram of a hypercube network in accordance with an exemplary embodiment.

The methodology illustrated in FIG. 5 and described above is effectively a weighted determination of the most common digit in the binary addresses of the processing devices that make up the set S. FIG. 6 illustrates the hypercube network of FIG. 1 showing that four of the nodes in the network are storing data for processing at a single location. The set of nodes S=(000, 001, 100, 111) and set of data D=(15, 6, 10, 20). Therefore, DataCount(O)=(21, 31, 25) and DataCount(1)=(30, 20, 26) meaning that the binary address of the center node C=101. In this example, this would be the processing device of the hypercube network that carries out the processing of the data.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The invention claimed is:

1. A method of operating a hypercube network of processing devices comprising:
   determining that a plurality of the processing devices are storing data to be processed at a single processing device;
   obtaining the addresses of the plurality of processing devices storing the data to be processed;
   selecting a processing device in the hypercube network to process the data to be processed, comprising:
      determining the most common number for each digit of the obtained addresses of the plurality of processing devices storing the data to be processed;
      determining a target address, wherein each digit of the target address comprises the determined most common number for that digit; and
   transferring the data to be processed to the selected processing device with the determined target address.

2. The method of claim 1, wherein, if the most common number for a digit of the addresses of the plurality of processing devices storing the data to be processed returns more than one result, selecting one of the returned results.

3. The method of claim 1, wherein, if a processing device of the plurality of processing devices storing the data to be processed is assigned more than one address, then the step of obtaining the addresses of the plurality of processing devices storing the data to be processed, in respect of the processing device that is assigned more than one address, obtains only one address for that processing device.

4. A computer program product, the computer program product comprising a computer readable storage medium having program instructions embodied therewith, the program instructions executable by a computer to cause the computer to:
   determine that a plurality of processing devices in a hypercube network of processing devices are storing data to be processed at a single processing device in the hypercube network;
   obtain the addresses of the plurality of processing devices storing the data to be processed;
   select a processing device in the hypercube network to process the data to be processed, comprising:
      determining the most common number for each digit of the obtained addresses of the plurality of processing devices storing the data to be processed;
      determining a target address, wherein each digit of the target address comprises the determined most common number for that digit; and transfer the data to be processed to the selected processing device with the determined target address; and wherein the computer readable medium is not transitory per se.

5. The computer program product of claim 4, wherein, if the most common number for a digit of the addresses of the plurality of processing devices storing the data to be processed returns more than one result, selecting one of the returned results.

6. The computer program product of claim 4, wherein, if a processing device of the plurality of processing devices storing the data to be processed is assigned more than one address, then the step of obtaining the addresses of the plurality of processing devices storing the data to be processed, in respect of the processing device that is assigned more than one address, obtains only one address for that processing device.

7. A system comprising:
a hypercube network of a set of processing devices, wherein each processing device in the set is associated with an address that comprises a first digit and a second digit;
a processor; and
a memory in communication with the processor, the memory containing program instructions that, when executed by the processor, are configured to cause the processor to perform a method, the method comprising:
identifying a subset of processing devices within the set of processing devices;
detecting a set of data that is configured to be processed at a single processing device in the set of processing devices, wherein each processing device of the subset of processing devices stores a portion of the set of data;
determining a target address of a target processing device in the set of processing devices, the determining comprising:
identifying the first digit of the address of each processing device in the subset of processing devices, resulting in a set of first digits;
identifying the second digit of the address of each processing device in the subset of processing devices, resulting in a set of second digits;
determining a most common number of the set of first digits;
establishing the most common number of the set of first digits as the first digit of the target address;
determining a most common number of the set of second digits; and
establishing the most common number of the set of second digits as the second digit of the target address; and
transmitting the set of data to the target processing device at the target address.

8. The system of claim 7, wherein determining the most common number of the set of first digits further comprises:
determining that two numbers are equally common in the set of first digits; and
selecting one of the two equally common numbers.

9. The system of claim 7, wherein determining the target address further comprises:
determining that a first processing device in the subset of processing devices is associated with more than one address;
selecting one address of the more than one address, resulting in a selected address for the first processing device and a set of non-selected addresses for the first processing device; and
removing the set of non-selected addresses of the more than one address from the determining the target address, such that wherein the set of first digits and the set of second digits do not include digits from the removed set of non-selected addresses.

10. A method comprising:
identifying a subset of processing devices within a set of processing devices in a hypercube network, wherein each processing device in the set is associated with an address that comprises a first digit and a second digit;
detecting a set of data that is configured to be processed at a single processing device in the set of processing devices, wherein each processing device of the subset of processing devices stores a portion of the set of data;
determining a target address of a target processing device in the set of processing devices, the determining comprising:
identifying the first digit of the address of each processing device in the subset of processing devices, resulting in a set of first digits;
identifying the second digit of the address of each processing device in the subset of processing devices, resulting in a set of second digits;
determining a most common number of the set of first digits;
establishing the most common number of the set of first digits as the first digit of the target address;
determining a most common number of the set of second digits; and
establishing the most common number of the set of second digits as the second digit of the target address; and
transmitting the set of data to the target processing device at the target address.

11. The method of claim 10, wherein determining the most common number of the set of first digits further comprises:
determining that two numbers are equally common in the set of first digits; and
selecting one of the two equally common numbers.

12. The method of claim 10, wherein determining the target address further comprises:
determining that a first processing device in the subset of processing devices is associated with more than one address;
selecting one address of the more than one address, resulting in a selected address for the first processing device and a set of non-selected addresses for the first processing device; and
removing the set of non-selected addresses from the determining the target address, such that the set of first digits and the set of second digits do not include digits from the set of non-selected addresses.

13. A computer program product, the computer program product comprising a computer readable storage medium having program instructions embodied therewith, the program instructions executable by a computer to cause the computer to:
identify a subset of processing devices within a set of processing devices in a hypercube network, wherein each processing device in the set is associated with an address that comprises a first digit and a second digit;

detect a set of data that is configured to be processed at a single processing device in the set of processing devices, wherein each processing device of the subset of processing devices stores a portion of the set of data;

determine a target address of a target processing device in the set of processing devices, the determining comprising:

identifying the first digit of the address of each processing device in the subset of processing devices, resulting in a set of first digits;

identifying the second digit of the address of each processing device in the subset of processing devices, resulting in a set of second digits;

determining a most common number of the set of first digits;

establishing the most common number of the set of first digits as the first digit of the target address;

determining a most common number of the set of second digits; and establishing the most common number of the set of second digits as the second digit of the target address; and transmit the set of data to the target processing device at the target address.

14. The computer program product of claim 13, wherein determining the most common number of the set of first digits further comprises:

determining that two numbers are equally common in the set of first digits; and selecting one of the two equally common numbers.

15. The computer program product of claim 13, wherein determining the target address further comprises:

determining that a first processing device in the subset of processing devices is associated with more than one address;

selecting one address of the more than one address, resulting in a selected address for the first processing device and a set of non-selected addresses for the first processing device; and removing the set of non-selected addresses from the determining the target address, such that the set of first digits and the set of second digits do not include digits from the set of non-selected addresses.

* * * * *